United States Patent
Dent et al.

[19]

[11] Patent Number: 5,931,893
[45] Date of Patent: Aug. 3, 1999

[54] EFFICIENT CORRELATION OVER A SLIDING WINDOW

[75] Inventors: Paul W. Dent, Pittsboro; Eric Wang, Cary, both of N.C.

[73] Assignee: Ericsson, Inc., Research Triangle Park, N.C.

[21] Appl. No.: 08/967,444

[22] Filed: Nov. 11, 1997

[51] Int. Cl.[6] .................................................. G06F 17/15
[52] U.S. Cl. ........................ 708/422; 708/423; 708/603
[58] Field of Search ...................... 364/728.03, 728.04, 364/750.5

[56] References Cited

U.S. PATENT DOCUMENTS

| | | | |
|---|---|---|---|
| 4,071,903 | 1/1978 | Head et al. | 364/728.04 |
| 5,365,549 | 11/1994 | Kazecki | 364/728.03 |
| 5,579,338 | 11/1996 | Kojima | 364/728.03 |
| 5,684,727 | 11/1997 | Campbell et al. | 364/728.03 |

FOREIGN PATENT DOCUMENTS

| | | |
|---|---|---|
| 0 707 385 A1 | 4/1996 | European Pat. Off. . |
| WO 96 26578 | 8/1996 | WIPO . |

Primary Examiner—David H. Malzahn
Attorney, Agent, or Firm—Jenkens & Gilchrist, P.C.

[57] ABSTRACT

The details of an improved correlator and efficient method of correlation are disclosed. The last M received signal samples are compared with all shifts of a given M-bit binary codeword. The correlator adds or subtracts each of the signal samples accordingly, as the corresponding shift of the codeword contains a binary "1" or "0" in that position. The total is output for each new signal sample received, with a shift of one position between the signal samples and the codeword.

24 Claims, 4 Drawing Sheets

FIG. 2

SIGNAL SAMPLE NUMBER (in Hex)
123456789ABCDEFGHI

```
1   1 1 1 1 0 0 0 1 0 0 1 1 0 1 0
2     1 1 1 1 0 0 0 1 0 0 1 1 0 1 0
3       1 1 1 1 0 0 0 1 0 0 1 1 0 1 0
4         1 1 1 1 0 0 0 1 0 0 1 1 0 1 0
5           1 1 1 1 0 0 0 1 0 0 1 1 0 1 0
6             1 1 1 1 0 0 0 1 0 0 1 1 0 1 0
7               1 1 1 1 0 0 0 1 0 0 1 1 0 1 0
8                 1 1 1 1 0 0 0 1 0 0 1 1 0 1 0
9                   1 1 1 1 0 0 0 1 0 0 1 1 0 1 0
A                     1 1 1 1 0 0 0 1 0 0 1 1 0 1 0
B                       1 1 1 1 0 0 0 1 0 0 1 1 0 1 0
C                         1 1 1 1 0 0 0 1 0 0 1 1 0 1 0
D                           1 1 1 1 0 0 0 1 0 0 1 1 0 1 0
E                             1 1 1 1 0 0 0 1 0 0 1 1 0 1 0
F                               1 1 1 1 0 0 0 1 0 0 1 1 0 1 0
G                                 1 1 1 1 0 0 0 1 0 0 1 1 0 1 0
H                                   1 1 1 1 0 0 0 1 0 0 1 1 0 1 0
I                                     1 1 1 1 0 0 0 1 0 0 1 1 0 1 0
```

2

EFFICIENT CORRELATION OVER A SLIDING WINDOW

BACKGROUND OF THE INVENTION

1. Technical Field of the Invention

The present invention relates in general to the telecommunications field and, in particular, to communications devices that utilize digital correlators to detect the presence of predetermined digital codes in noise, such as spread spectrum receivers, packet data receivers, or in frequency hopping synchronization applications.

2. Description of Related Art

FIG. 1 is a block diagram of a prior art correlator, which is used to compute correlations between the last M signal samples received and an M-bit codeword. An M-element delay line 10 stores received signal samples and sequentially shifts them through each of the M stages. Consequently, the delay line memory elements contain the last M signal sample values received. After each new sample is shifted in and one old sample is shifted out, the M sample values are read out of the delay line into M sign-changers 12, where the M sample values are multiplied by +1 or −1 according to the bits $b_1 \ldots b_M$ of a predetermined code with which correlation is to be computed. The sign-changed values are then summed in adder 13 to produce a correlation result.

In general, the process of correlating an M-element vector $A=(a1,a2 \ldots aM)$ with an M-element vector $B=(b1,b2 \ldots bM)$ involves forming the inner product $A \cdot B = a1 \cdot b1 + a2 \cdot b2 + \ldots aM \cdot bM$. When the elements of one of the vectors (e.g., B) comprises only binary values (arithmetically +1 or −1), the products such as $a1 \cdot b1$ simplify to $\pm a1$, but the process of adding the M values $\pm a1 \pm a2 \ldots \pm aM$ is still a significant effort when it has to be performed for every new value of "a" received.

The prior art includes many variations of the correlator shown in FIG. 1. For example, signal samples may be single-bit or "hard-limited" quantities of only +1 or −1 instead of multi-bit quantities. The sign-changers used then are typically simple XOR gates. In that case, the adder 13 may first add pairs of single-bit values to obtain M/2 two-bit values; M/4 two-bit adders then add two-bit values to obtain M/4 three-bit values, and so on. Such a structure, known as an "adder tree", is simpler when the input values are single-bit rather than multi-bit values.

For single-bit value signal samples, the adder tree can be replaced by an up/down counter that scans the M values, and counts up when a +1 is encountered and down when a −1 is encountered. Likewise, for multi-bit value signal samples, a parallel adder tree can be replaced by a sequential adder that extracts each of the M values, in turn, from the delay line memory and adds it to an accumulator. In the latter case, the logic employed must operate M-times as fast as in the parallel adder case. Consequently, there is a trade-off between the overall speed of the correlator and the logic complexity. Nevertheless, in each of the above-described prior art correlator variations, it is necessary to combine M values anew after each new signal sample is received. However, as described below, these problems are resolved by the present invention.

SUMMARY OF THE INVENTION

In accordance with the present invention, a correlator and method of correlation are provided for use in comparing the last M received signal samples with all shifts of a given M-bit binary codeword. The correlator adds or subtracts each of the signal samples accordingly, as the corresponding shift of the codeword contains a binary "1" or "0" in that position. The total is output for each new signal sample received, with a shift of one position between the signal samples and the codeword. In a preferred embodiment, a memory unit stores on the order of M partial correlations for M successive, partially overlapping correlations. After receiving each number, N, of new samples, where N is less than M, an arithmetic unit combines the N new values with every possible pattern of plus and minus signs. This process is accomplished efficiently by noting that half of the combinations are the negatives of the other half, and that the remaining two-to-the-power of (N−1) combinations can be computed with only one addition or subtraction per value, by forming the combinations in Grey-code order. Selected ones of the so-formed combinations are then added to selected stored partial correlations together with up to N−1 received sample values, in order to complete the computations of N desired total correlations. The total effort to compute N successive correlations over a sliding window is thus expressed approximately by the formula:

$(M+2^{(N-1)}+N(N-1))/N$ operations per correlation value computed. The value of N is preferably chosen to minimize the above expression, with the number of operations then being considerably less than the M operations per computed value realized by prior art methods. As such, the scope of the invention can be advantageously expanded to include the computation of correlations on a sliding window with a plurality, L, of different predetermined codes. The number of operations per correlation is then expressed approximately by the formula:

$(LM+2^{(N-1)}+L(N-1)^{2+}(N-1))/LN$, which is preferably minimized by selecting an optimum number for N.

BRIEF DESCRIPTION OF THE DRAWINGS

A more complete understanding of the method and apparatus of the present invention may be had by reference to the following detailed description when taken in conjunction with the accompanying drawings wherein:

FIG. 2 is a diagram that illustrates an arrangement of overlapping consecutive shifts of a 15-bit code, which can be correlated with received signal samples in accordance with a preferred embodiment of the present invention;

DETAILED DESCRIPTION OF THE INVENTION

Figure 1:
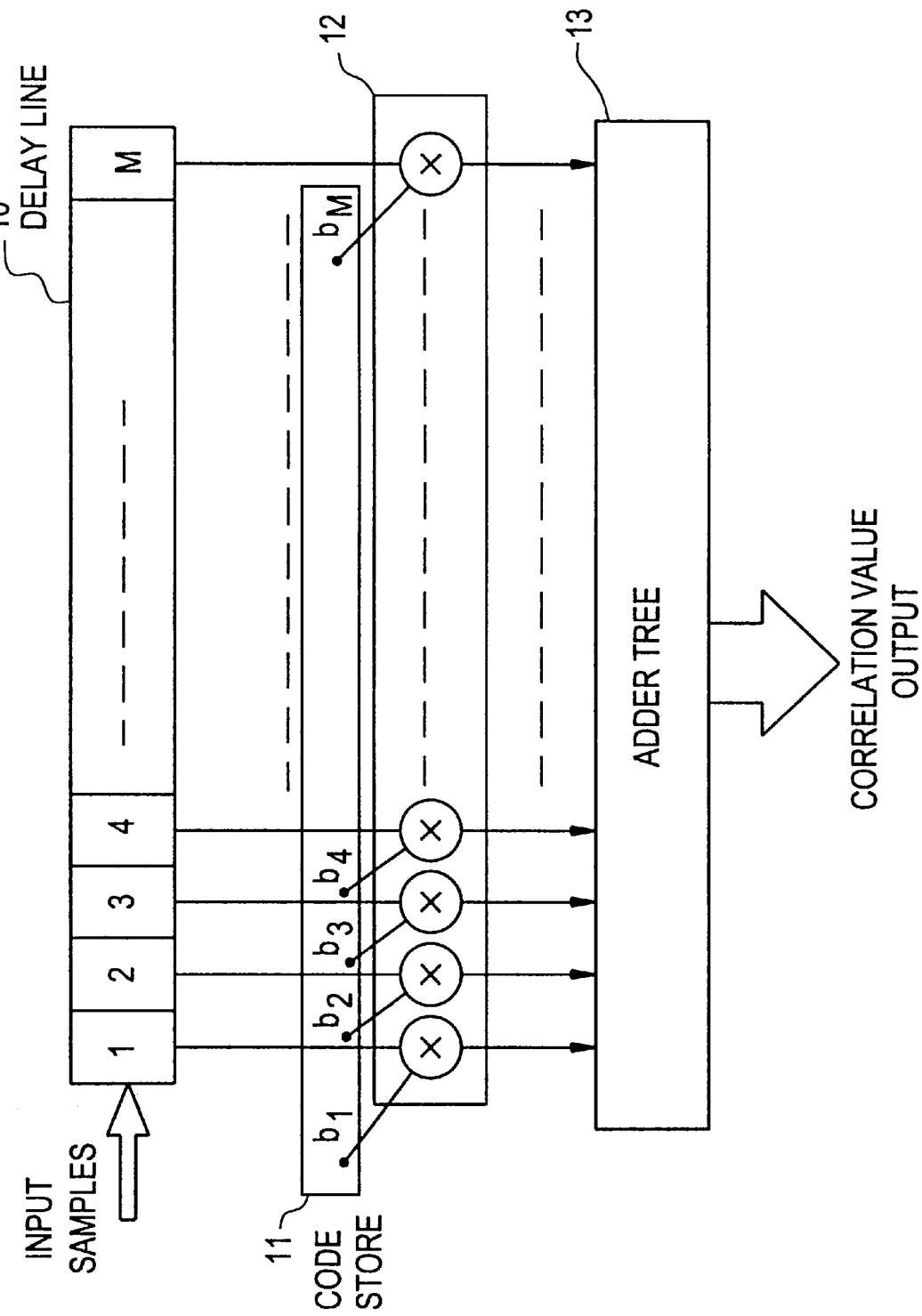
FIG. 1 is a block diagram of a prior art correlator.

The preferred embodiment of the present invention and its advantages are best understood by referring to FIGS. 1–4 of the drawings, like numerals being used for like and corresponding parts of the various drawings.

FIG. 2 is a diagram that illustrates an arrangement of overlapping consecutive shifts of a 15-bit code, which can be correlated with received signal samples in accordance with a preferred embodiment of the present invention. Referring to FIG. 2, a plurality of received signal samples are hexadecimally numbered (horizontally) 1 to I. Shown underneath the signal sample numbers are different shifts of a 15-bit codeword with which 15 received samples are to be correlated. The left-most vertical numbering denotes the number of the correlation performed. For example, correlation number 1 shall correlate the codeword in row number 1 with signal samples numbered 1,2,3 . . . to F.

In this embodiment, FIG. 2 illustrates an arrangement just before sample number F is received. The samples not yet received are highlighted with bold print and positioned to the right of samples already received. A dividing line 2 is shown between bits of codewords yet to be correlated with sample values not yet received, as compared with bits to the left of the dividing line, which have already been correlated with received samples. Memory elements 1 to E contain partial results compared to the uncompleted correlations with rows 1 to E, respectively. FIG. 2 shows that sample number F has to be received before correlation number 1 can be completed. The receipt of sample numbers F,G,H,I will allow the completion of correlations numbers 1,2,3 and 4, and will allow the correlation with rows F,G,H and I to at least get started. The already started correlations numbers 5 to E can be continued four more positions to the right after sample numbers F,G,H and I are received, by accumulating different combinations of the four new samples with the partial correlations contained in memory elements 5 to E.

Observe that the combination of four new samples S(F), S(G),S(H),S(I), which is required to complete correlation number 4, is $-S(F)+S(G)-S(H)+S(I)$. The signs of this combination correspond to the four remaining bits 1010 in row 4. A "1" signifies a minus sign, while a "0" signifies a plus sign. Other combinations that use other sign patterns are required to continue accumulating correlations for rows 5 to E, with a total of 11 combinations being needed for row 4 and rows 5 to E.

In one embodiment of the present invention, a method is used to compute all possible sign combinations of S(F),S(G),S(H) and S(I), a total of 16 combinations, even if less than 16 combinations are needed, because an efficient method can be used for computing all 16 combinations in Grey-code order. Moreover, a combination with signs as indicated by the bit pattern 1100 is just the negative of the combination with signs indicated by 0011. Consequently, only half of the 16 combinations need to be formed, and the other half are the negatives of the formed half. As such, the eight combinations to be computed can be formed using only one addition or subtraction for each new value after the first value is formed, if the eight combinations are computed in Grey-code ordering of the sign pattern. In this ordering, only one sign change occurs between successive patterns, as explained below.

For example, starting with the pattern 0000, which requires the sum of the four new values (counted as four operations), the Grey-code ordered computation for the combination, C, proceeds as follows:

| | | |
|---|---|---|
| 0000 | S(F) + S(G) + S(H) + S(I) = | C(0) |
| 0001 | S(F) + S(G) + S(H) − S(I) = | C(1) = C(0) − 2S(I) |
| 0011 | S(F) + S(G) − S(H) − S(I) = | C(3) = C(1) − 2S(H) |
| 0010 | S(F) + S(G) − S(H) + S(I) = | C(2) = C(3) + 2S(I) |
| 0110 | S(F) − S(G) − S(H) + S(I) = | C(6) = C(2) − 2S(G) |
| 0111 | S(F) − S(G) − S(H) − S(I) = | C(7) = C(6) − 2S(I) |
| 0101 | S(F) − S(G) + S(H) − S(I) = | C(5) = C(7) + 2S(H) |
| 0100 | S(F) − S(G) + S(H) + S(I) = | C(4) = C(5) + 2S(I) |

This process completes the computation of all eight combinations, using four operations to form the first value, and one operation (the addition or subtraction of two times a received sample from a previous combination) to form subsequent combinations in the above-described Grey-code order. The scaling of a sample value by two is not counted herein as an operation, because the use of binary arithmetic in which a right shift by one position is equivalent to multiplying by two is assumed.

The exemplary embodiment described above may be extended to the forming of all combinations of more than four values. The Grey-code ordering of computations for any number of values is characterized by successive binary codes that differ in only one bit position, as illustrated above.

The combinations above, which were formed using a total of 11 operations, are combined with the stored values representing signal samples 4 to E as follows: C(5) is subtracted from stored value 4 to complete correlation number 4; C(2) is subtracted from stored value 5; C(6) is added to stored value 6; C(3) is added to stored value 7; C(6) is subtracted from stored value 8; C(4) is added to stored value 9; C(2) is added to stored value A; C(1) is added to stored value B; C(7) is added to stored value C; C(3) is subtracted from stored value D; C(1) is subtracted from stored value E; and C(0) is subtracted from stored value F. As demonstrated, this process has taken an additional 12 operations.

Next, the signal sample S(F) is subtracted from stored value 1 in order to complete the correlation corresponding to row number 1. Similarly, the signal sample S(F) is added to stored value 2, and the signal sample S(G) is subtracted from stored value 2 to complete correlation number 2. Also, the signal sample combination of $-S(F)+S(G)-S(H)$ is combined with stored value 3 to complete correlation number 3. At this point, this process has taken 1+2+3=6 more operations. However, this number may be reduced by noting that the combination $-S(F)+S(G)-S(H)\pm S(I)$ was already computed, and removing the contribution $\pm S(I)$ requires one operation. Consequently, correlation number 3 can be completed with only two operations instead of three.

Better still, it is possible to start computing combinations in Grey-code order at any point, by starting with forming the following combinations:

$-S(F)+S(G)$;

$-S(F)+S(G)-S(H)$; and $-S(F)+S(G)-S(H)+S(I)$.

Observe that the combination of the three values required to complete correlation number 3 is formed at the second step. After the third step, the other combinations are formed in the Grey-code order:

1010 (formed at third step above)

1011

1001

1000

1100

1101

1111

1110 which takes only seven additional operations.

At this point, observe that four correlations have been completed for a total effort expended according to the following formulae (where N=4 and M=15 in the above-described example):

(1) $N+(2^{(N-1)}-1)$ to form all $2^N$ possible sign combinations of N values;

(2) 1+2+3 . . . (N−1)=0.5N(N−1) operations to complete correlation numbers 1 to (N−1); and (3) M−N+1 operations to complete correlation number N and continue M−N other correlations. In addition, correlation numbers G, H and I are initiated by forming combinations of 3, 2 and 1 values (the values of signal samples 1, 2 and 3) and adding them to the storage locations vacated by completed correlations 1, 2 and 3, and thus cyclically re-using the same memory locations. This process also requires 0.5N(N−1) operations.

In adding up all these operations, it is determined that after each reception of N new signal samples, N completed correlations are formed using 0.5N(N−1)+M−N+1+0.5N(N−1)+N+2$^{(N-1)}$−1=M+2$^{(N-1)}$+N(N−1) operations, or (M+2$^{(N-1)}$+N(N−1))/N operations per correlation.

This process can be reduced slightly by computing the starting and finishing triangular fillets more efficiently by noting that a combination of greater than N/2 values can be formed by subtracting a combination of less than N/2 values from one of the already formed combinations of all N values. Consequently, the computation of the fillets then requires about 0.5N(N−1) operations instead of N(N−1) operations.

The following example illustrates the savings in effort that can be obtained by use of the above-described correlative method of the present invention. The example illustrates the computation of correlations between all shifts of a received signal and a M=1024-bit codeword. The total number of operations per (1024-point) correlation obtained with different values of new samples N, can be expressed as:

$N$ = 4   5   6   7   8   9   10

261 212 181 162 151 151 161

Observe that a value of N=8 or 9 results in an optimum reduction of the number of operations (about 151 operations) required to perform a 1024-point correlation, which results in a savings of a factor of seven compared to the prior art. Using the method of the present invention, it is possible to fabricate 1024-bit correlators having a speed/power/cost trade-off as attractive as prior art 151-bit correlators, thus achieving a longer correlation computation for an equal cost in terms of speed, power or cost. This trade-off translates into higher communications equipment performance when practicing the present invention.

Furthermore, when numerous shifts of received data samples must be correlated with more than one codeword, additional savings can be realized. The computation of all combinations of N data samples requires, as described above, 2$^{(N-1)}$+N−1 operations by performing them in Grey-code order. Then M−N+1 of these combinations are added to a first set of storage locations for correlation with a first codeword, and a second set of storage locations for correlation with a second codeword. Calculating the triangular fillets of values that have to be added to initiate and complete N correlations with each codeword requires, as described above, at most N(N−1) operations per codeword, which results in a total effort of L(M−N+1)+2$^{(N-1)}$+N−1+LN(N−1)=LM+L(N−1)$^2$+ 2$^{(N-1)}$+(N−1) operations to complete N correlations with L codewords. Consequently, the total operations per correlation can be expressed as (LM+L(N−1)$^2$+2$^{(N-1)}$+(N−1))/LN.

For example, to correlate a sliding 1024-signal-sample segment with six different 1024-bit codes requires the following effort:

$N$ = 9   10   11   12

126  120  118  125 which illustrates that N=11 would be the most efficient choice.

The above-described methods can be used successfully for any arbitrary codewords. For correlating with specific codewords, even more efficient correlators may be devised in accordance with the above-described principles of the present invention. For example, consider that when N is selected to be greater than $\log_2(M)$, more combinations of N signal sample values are calculated than needed. However, they are calculated in efficient Grey-code order requiring only one operation per signal sample value. Although it would be desirable to compute only the combinations required, by omitting the computation of certain combinations, it is no longer certain that all of the required combinations can be reached with only one extra operation per combination. In effect, omitting the calculation of certain combinations creates disjointed and separate groups of combinations. Consequently, it is necessary in each case to examine the disposition of each member of the set of required combinations to determine how many operations are required to reach it from another member. The number of operations is equal to the Hamming distance between the corresponding bit pattern that describes the signs (plus or minus) that shall be used to combine signal samples. Given the distance structure, which is the set of all Hamming distances from every N-bit sub-code to every other N-bit sub-code in the set to be computed, the optimum order for computing them all for a minimum effort may be determined by using a Viterbi algorithm to test all possible paths. It may turn out for a particular code that the number of operations to compute the needed combinations of N signal samples is less than the value 2$^{(N-1)}$+N−1, which was assumed for the general case of an arbitrary code. As such, a more efficient correlator can then be fabricated for these particular codes, in accordance with the above-described principles of the present invention.

Alternatively, a code can be specifically formulated to enable the use of an efficient correlator. For example, such a code can be any M-bit code with the property that all overlapping shifts of N-bits form a contiguous set of adjacent N-bit codes (in the Hamming distance sense), such that signal combinations can be computed using only one operation per additional combination after the first combination. Moreover, half of the codes in the contiguous set should be the complements of the other half making it unnecessary to compute the complementary combinations, since they are the negatives of others.

Figure 3:
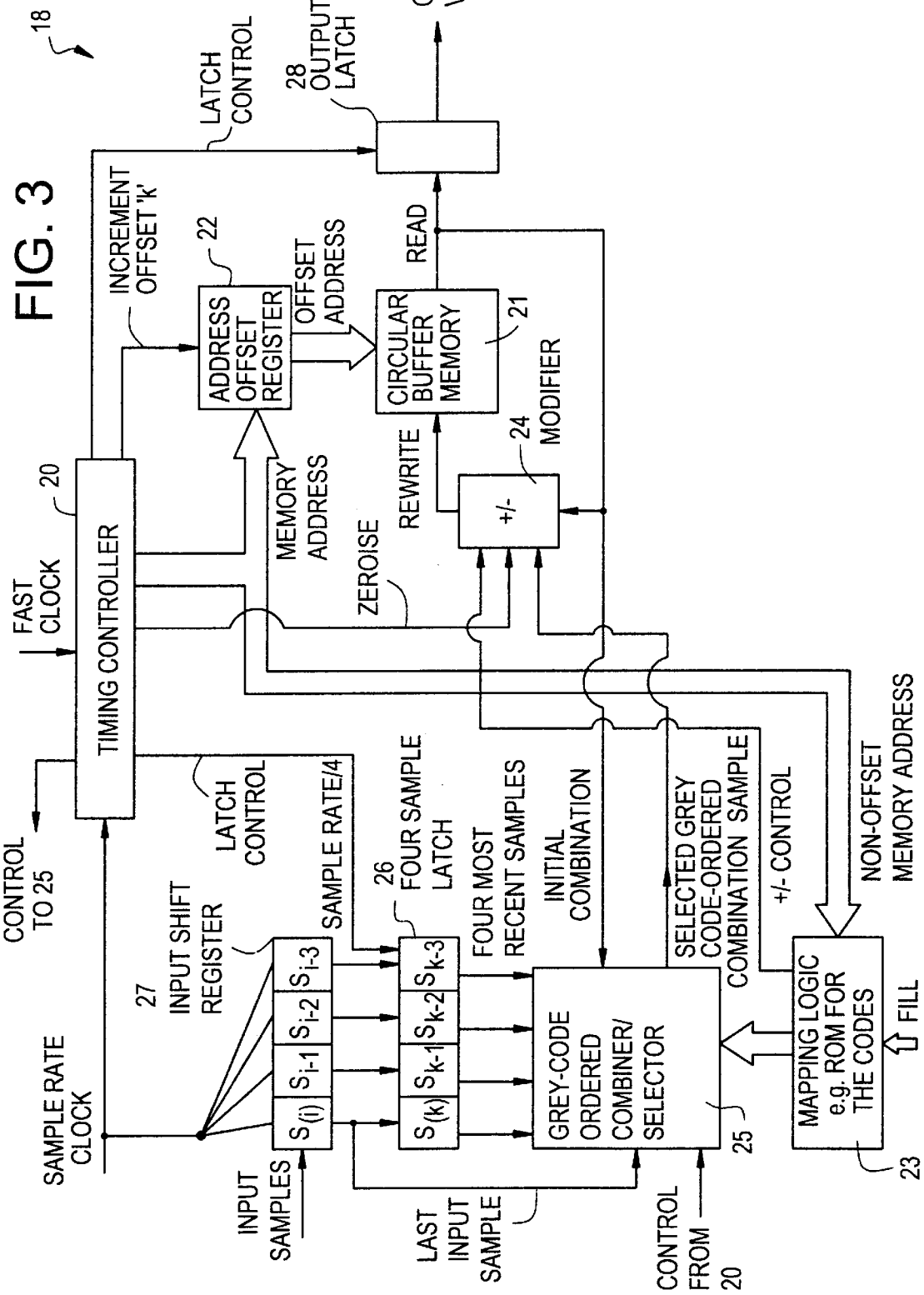
FIG. 3 is a schematic block diagram of an exemplary correlator, which can be used to implement an embodiment of the present invention.

FIG. 3 is a schematic block diagram of an exemplary correlator 18, which can be used to implement an embodiment of the present invention. The exemplary correlator 18 includes a timing controller 20, which controls the input of new signal samples by generating a signal sample clock. The sequence of operations controlled by timing controller 20 repeats every N sample clock cycles. Every N sample clock cycles, the timing controller 20 controls the inputting of N new sample values (where N=4 in this example) and their additions or subtractions from N locations in a memory 21 using an adder/subtractor (modifier) 24. Each such addition or subtraction comprises a memory read, modify and rewrite cycle such that the value stored in the memory location represents an accumulation of values previously added or subtracted. Whether or not one of the N input samples is added or subtracted depends on one of the first or last N bits of the codeword with which the signal is being correlated. A required sign pattern is generated by mapping logic circuitry 23, which is configured according to the codeword to produce the correct add/subtract commands to modifier 24 at different times under the control of the timing controller 20. The memory 21 is utilized as a circular buffer to hold M partially completed correlations. The next correlation to be completed is at memory location "k", where the address for "k" is maintained in an address offset register 22. The partial correlation at address "k" will be completed by adding an N-sample combination of N previously input samples maintained in an N-element latch 26. A selector 25 comprises logic that functions to compute and store, in Grey-code order, $2^{(N-1)}$ (i.e., eight, if N=4) combinations of the N previously input samples maintained in latch 26, starting with the N-sample combination previously stored in memory location "k-N". Selector 25 outputs the selected one of these combinations necessary to complete correlation "k", under the control of N-1 selection lines from mapping logic 23. At the same time, mapping logic 23 outputs an add/subtract command to modifier 24, dependent upon whether the combination is to be added or subtracted (i.e., sign inverted or non-inverted before adding).

Next, timing controller 20 outputs the just-completed correlation "k", by enabling an output gate 28 to couple the just-completed correlation "k" value to the output, and substitutes a zero value to be written to memory location "k", thus clearing the memory location "k" to zero. Timing controller 20 then controls selector 25 to select the latest input sample from an input shift register 27 which is to be passed to adder/subtractor 24, and at the same time controls mapping logic circuitry 23 to sequentially select memory locations k,k+1,k+2, . . . k+1-N to be modified by adding or subtracting the new input sample. Mapping logic circuitry 23 also controls the addition or subtraction for each of the N memory locations, according to a pre-stored sign pattern that depends on the codeword bits.

For example, if the first four bits of the codeword are 1101, and the last four bits are 1010, then mapping logic 23 causes a subtraction of a first sample of four new samples input to register 27 (corresponding to the codeword having a "1" (='-') in the first bit position), an addition to location k+1 (corresponding to the last codeword bit being a "0" (='+')), subtraction from location k+2 (corresponding to the second-to-last codeword bit being a "1"), and an addition to location k+3 (corresponding to the third-to-last codeword bit being a "0"). When the second sample of the next four samples is input to register 27, mapping logic 23 will generate a "-" sign for memory location "k" (corresponding to the second bit of the codeword being a "1"), a "-" sign for location k+1 (corresponding to the first codeword bit being a "1"), a "+" sign for location k+2 (corresponding to the last bit of the codeword being "0"), and a "-" sign for location k+3 (corresponding to the second-to-last bit of the codeword being a "1"), and so on. The following diagram can assist with understanding the above-described pattern:

k 1101
k+1 0110
k+2 1011
k+3 0101

The above-underlined bits are the first bits of the codeword that determine the signs of samples for initializing new correlations, which will be formed in the same memory locations vacated by correlations completed by using the non-underlined bits as signs (the last bits of the codeword to be correlated). The correlation memory location is cleared to zero between using the last non-underlined bit to complete a correlation and the first underlined bit to start a new correlation in the same location, which is performed as described above by timing controller 20 enabling output gate 28 at the appropriate times.

Interlaced with processing the N new samples to complete N correlations and initialize N new correlations, timing controller 20 controls the addition or subtraction of previous N-sample combinations stored in selector 25 to the other M-N locations of memory 21. This computation may be spread more or less evenly over the N new sample periods, by updating (M-N)/N=M/N-1 locations per sample period. Timing controller 20 provides to mapping logic 23 increments "i" to the base address "k" stored in address register 22, starting with i=N and increasing by one to i=M-1, until M-N locations have been updated. Mapping logic 23 modulo-M adds the increment "i" to the base address "k" to obtain the memory address location to be updated.

The increment "i" provided by timing controller 20 is also used by mapping logic 23 to determine the N-sample combination to be selected by selector 25, and whether the combination shall be inverted or not (by providing a "+" or "-" sign to modifier 24). The index (value of "i") of the combination that shall be combined with the contents of a particular memory location depends on the codeword bits, as can be more readily understood by reviewing FIG. 2 where the value N=4 is used as an example. The bracketed column of four-bit segments indicates the combination to be added to update the partial correlation of each row. If a combination is stored in selector 25 corresponding to the complement of these bit patterns, then the complementary combination is selected at the same time as a minus sign is provided to modifier 24; otherwise the correct combination (if available) is used with a "+" sign.

The mapping of increment "i" to N-1 selection control lines input to selector 25, and a selection of +/- for modifier 24 may be accomplished, for example, by storing M-N, N-bit control signals in a memory area. When the correlation codeword was chosen or changed, then the appropriate values would be loaded into this memory area. Also, the memory area could be extended to contain the N×N sign bits needed to control formation of the starting and ending triangular fillets, which results in a total of M×N bits of memory.

Alternatively, for a fixed correlation code, a Read-Only-Memory (ROM) can be programmed with this information, and in some instances, it can be more efficient to translate the bits of the increment "i" with hard-wired logic, into the N control and selection signals to modifier 24 and selector 25. All of these possibilities, as well as the others described above, are within the scope of the present invention.

Figure 4:
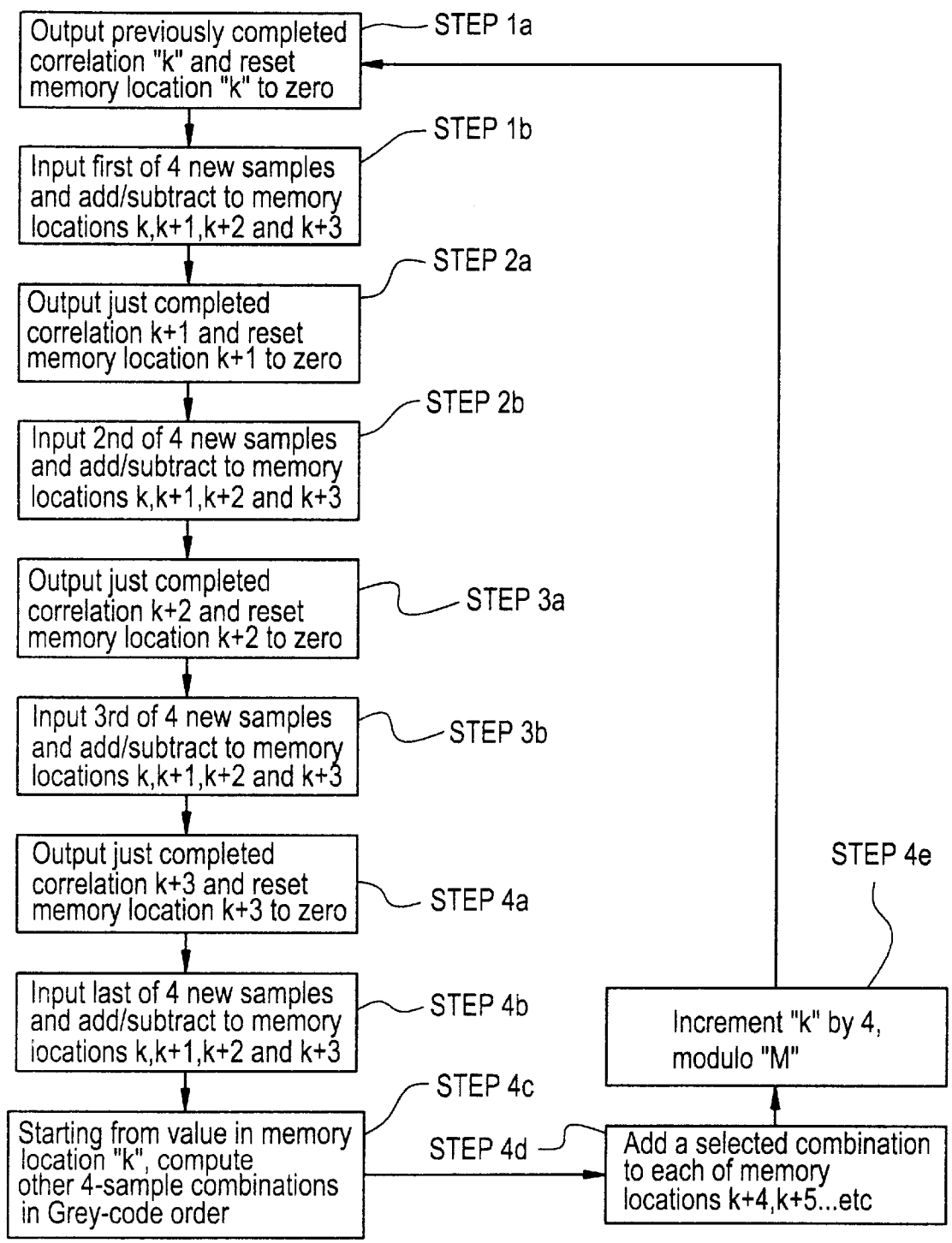
FIG. 4 illustrates an exemplary sequence of steps that can be used to implement the present invention.

FIG. 4 now illustrates an exemplary timing sequence of steps for a value of N=4. At step 1a of the sequence, the previously completed correlation at the address "k" is output from the memory location, and that location is zeroed. At step 1b, the first of four new signal samples are input and added to or subtracted from memory addresses k, k+1, k+2 and k+3, as determined by the address offset register 22 which contains the address "k". Whether to add or subtract is determined by the contents of the mapping logic 23.

At step 2a, the completed correlation is output from memory location k+1, and the memory location k+1 is zeroed. At step 2b, the second signal sample is added to or subtracted from memory locations k, k+1, k+2 and k+3.

At step 3a, the completed correlation is output from memory location k+2, and the memory location k+2 is zeroed. At step 3b, the third signal sample is added to or subtracted from memory locations k, k+1, k+2 and k+3.

At step 4a, the completed correlation is output from memory location k+3, and the memory location k+3 is zeroed. At step 4b, the fourth signal sample is added to or subtracted from memory locations k, k+1, k+2 and k+3. At step 4c, starting with the four-sample combination in memory address "k", other $2^{(N-1)}-1$ (i.e., 7 in this case, where N=4) four-sample combinations are computed in Grey-code order. At step 4d, a selected one of the combinations computed in step 4c is added to the contents of each one of the remaining memory locations k+4, k+6 . . . k+M−1. For each such memory location, the combination selected to be added to that location is predetermined for a particular choice of codeword. At step 4e, address k is increased by 4 (modulo-M), and the sequence is repeated from step 1a.

After step 4b has been completed, memory location "k" contains a combination of the four signal values with signs corresponding to the first four bits of the codeword. This combination is used as a starting point for the computation at step 4c of the other seven of the eight total combinations, which together with their respective negatives, comprise the 16 possible sign combinations of the four signal samples. One of these combinations will be needed to complete correlation k+4 by adding it to the contents of memory location k+4. In general, the order in which this value will be computed depends on the code with which the signal is being correlated, and it may be the last value to be computed. Therefore, steps 4a through 4e are required to be completed within one sample clock period, in order to be sure to obtain in time the combination needed to complete correlation k+4 (i.e., the incremented value of k) . The correlation so-completed is output at step 1a of the next cycle. Note that steps 4e and 4d may be reversed (i.e., k can be incremented by 4 first at step 4d), but then the address k+4, k+5 . . . k+M−1 must be expressed in terms of the new k value as k, k+1, k+2 . . . k+M−5 for step 4e.

The accumulation of the four sample combinations computed at step 4c to the other M−5 memory locations, k+5, k+6, . . . M−1,0,1, . . . k−1, has to take place during the next execution cycle of steps 1 through 4. Consequently, in total, selected ones of the computed combinations have to be added to the contents of M−4 memory locations, including memory location k+4, during execution of step 4d and step 4c of the next cycle. By itself, step 4c requires seven operations to be completed in less than one sample clock period, but these operations can be executed in parallel with the four operations of step 4b. The other M−4 operations have to be completed during the remainder of the fourth sample period plus the other three operations, which is a total of M−4+7 operations that have to be accomplished within four sample clock periods. This can be accomplished by providing a computational speed of at least (M+3)/4 operations per sample clock period.

For example, if M=64, a computational speed of at least 17 operations per sample clock period will be needed in addition to the parallel execution of steps 1 through 4d. Each of steps 1–4d consumes an additional four arithmetic operations per sample clock period, so all of the operations can be accommodated if timing controller 20 has available a high-speed clock of at least 21 times the sample clock frequency, which allows 21 read-modify-rewrite cycles to memory 21 per sample clock period. Notably, this is a factor of three less than a prior art sliding correlator of length 64.

The required high-speed sample clock frequency can be reduced by allowing computations of the seven new four-sample combinations to occur at the same time while the previous seven values are being used. This can occur if two alternative sets of seven memory locations are provided. The seven operations needed to compute the seven new combinations can then occur in parallel with the addition of previous combinations to M−4 memory locations, and the speed of the read-modify-rewrite cycles needed for memory 21 is reduced to 4+(M−4)/4 or 19 cycles per sample clock period for a M=64 correlator. Of course, it is possible to trade-off the provision of more parallel processing for more speed or reduced computation speed per processing element. For example, memory 21 can be split into two banks, and two adder/subtractors can be provided so that two read-modify-rewrite cycles can be performed in parallel per high-speed clock period.

The ultimate in parallelism is to split memory 21 into M/N banks of N elements, with each bank being connected to a corresponding one of M/N adder/subtractors. The four consecutive memory locations to be updated every new sample clock period can be stored in different banks, as can the other (M−N)/N memory locations such that all the required memory read-modify-rewrite cycles can occur in parallel. In order to match such speed, the $2^{(N-1)}$ combinations of N samples needed by selector 25 can be computed in Grey-code order using a chain of $2^{(N-1)}-1$ cascaded adders, whereby an adder adds or subtracts twice a sample value to/from the output of a preceding adder to obtain all combinations in parallel with only the ripple-through delay of the logic. Such an arrangement has only about 1/N the hardware complexity of a prior art, fully parallel correlator that requires M−1 parallel adders.

As such, the method of the present invention can be used to form correlators of either longer correlation length, lower hardware complexity, higher speed, lower power consumption, or any combination of these advantages, in comparison with prior art methods. In accordance with the present invention, the improved correlator can be employed to correlate all shifts of a set of received signal samples, wherein the set does not have to be a contiguous set of signals but can be received, for example, in bursts (e.g., as in a Time Division Multiple Access (TDMA) system, or "hops" in a frequency hopping system). A need for the present inventive method arises, for example, whenever there is uncertainty about the timing of a received signal. Such a need also arises in a Code Division Multiple Access (CDMA) system when a "RAKE" receiver is to be constructed to combine signals received along different delay paths, by despreading different delayed sets of signal samples with a despreading code to form different "RAKE taps". In accordance with the invention, the present correlator can be used efficiently to simultaneously despread a large plurality of RAKE taps.

Furthermore, the method of the present invention can be used to compute correlations between successive shifts of M consecutive signal samples and a signal pattern of M stored sample values which are not restricted to binary values, but can include, for example, ternary values of +1,−1 and 0. All 3** N possible combinations of N signal values can be computed efficiently in a Grey-coded order, wherein only one digit at a time is changed through its allowed set of values, thus enabling a faster correlation algorithm to be devised in accordance with the inventive principles described above.

The invention is also useful when correlations must be made with several shifts of a number of different CDMA codes, as in, for example, a navigation receiver for processing CDMA signals received from a plurality (e.g., 4 or more) Global Positioning System (GPS) satellites.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for producing correlations between a binary code word including a predefined first plurality of bits and a corresponding plurality of successively input signal samples, comprising the steps of:

storing a first plurality of partially completed correlations in a first storage location;

inputting a second plurality of said input signal samples to a second storage location, said second plurality less than said first plurality of bits;

responsive to a sign of said second plurality of said input signal samples, adding or subtracting said second plurality of said input samples in said second storage location to or from said second plurality of said input samples to produce a first plurality of sample combinations; and responsive to said sign of said second plurality of said input signal samples, adding or subtracting said first plurality of sample combinations to or from a first selected plurality of said partially completed correlations to produce a second plurality of said partially completed correlations and a completed correlation.

2. The method of claim 1, further comprising the steps of:

combining a selected plurality of said second plurality of said input signal samples with a second selected plurality of said partially completed correlations to produce a plurality of completed correlations, a total number of completed correlations equal to said second plurality;

responsive to said second plurality of said input signal samples, creating a new first plurality of partially completed correlations; and repeating the above-recited steps.

3. The method of claim 2, wherein said adding or subtracting comprises a Grey-code ordering of plus and minus sign choices.

4. A method for computing successive inner products between a first number of given fixed values and the same first number of arbitrary input values selected from a stream of sequential input values, comprising the steps of:

maintaining a set of partially completed successive inner products;

selecting a second number of said arbitrary input values to be processed next in sequence, said second number being less than said first number;

utilizing said second number of said arbitrary input values to complete a calculation of the same second number of successive inner products by combining said second number of said arbitrary input values with the same second number of said partially completed successive inner products using selected ones of said fixed values in multiplication with said selected arbitrary input values;

forming a set of updating values as inner products between said second number of arbitrary input values and at least all possible sets of the same second number of fixed values selected from adjacent positions within said first number of given fixed values;

initializing a number of new partially completed inner products corresponding to said same second number of completed successive inner products;

combining the remaining as yet uncompleted partially completed inner products with selected ones of said updating values to form updated partial inner products; and repeating the above-recited steps to obtain said second number of inner products each time the above-recited steps are executed.

5. The method of claim 4, wherein said fixed values comprise the binary values +1 and −1 and said multiplication comprises manipulating a sign.

6. The method of claim 5, wherein said set of updating values is computed in Grey-coded order of all possible sets of an equal number of fixed values whereby one only binary digit changes polarity between successive sets.

7. The method of claim 6, wherein all of said updating values subsequent to a first computed value are derived from an already computed value by addition or subtraction of twice the value of one of said selected input values.

8. The method of claim 5, wherein at least one of said updating values is computed from a previously computed value by adding or subtracting twice the value of one of said selected input values.

9. The method of claim 5, wherein all of said updating values subsequent to a first computed value are derived from an already computed value by addition or subtraction of twice the value of one of said selected input values.

10. The method of claim 4, wherein said fixed values comprise the ternary values +1, 0 or −1 and said multiplication comprises manipulating a sign or said multiplication step is eliminated.

11. The method of claim 10, wherein at least one of said updating values is computed from a previously computed value by adding or subtracting one or two times the value of one of said selected input values.

12. The method of claim 4, wherein at least one of said updating values is computed from a previously computed value by adding or subtracting a constant times the value of one of said selected input values.

13. The method of claim 4, wherein at least one of said updating values is computed by combining two previously computed values.

14. The method of claim 4, wherein at least one member of said set of updating values is formed using the negative of another member of said set of updating values.

15. The method of claim 4, wherein half of the members of said set of updating values are formed by using the negatives of the other half of the members.

16. A method for computing successive inner products between a first plurality of predetermined vectors, each of said first plurality of predetermined vectors containing a first plurality of ordered values and vectors formed by successive shifts of a sequence of arbitrary input values, comprising the steps of:

maintaining for each of said first plurality of predetermined vectors a set of partially completed successive inner products;

selecting a number of said input values to be processed next in sequence, said number of said input values being less than said first plurality of ordered values;

utilizing said number of said input values to complete a calculation for each of said first plurality of predetermined vectors of a number of inner products equal to said number of said input values using selected elements of said predetermined vectors in multiplication with said selected input values;

forming a set of updating values as inner products between said number of said input values and at least all possible sets of the same number of fixed values selected from adjacent positions within any of said first number of predetermined vectors;

initializing a number of new partially completed inner products based on said completed inner products;

combining the remaining as yet uncompleted partially completed inner products with selected ones of said updating values to form updated partially completed inner products; and repeating the above-recited steps to obtain said number of completed inner products with each of said first plurality of predetermined vectors each time the above-recited steps are executed.

17. The method of claim 16, wherein said fixed vectors comprise elements of binary values of +1 or −1 and said multiplication comprises manipulating a sign.

18. The method of claim 17, wherein at least one of said updating values is computed from a previously computed value by adding or subtracting one or two times the value of one of said selected input values.

19. The method of claim 16, wherein said fixed vectors comprise elements of ternary binary values of +1, 0 or −1, and said multiplication comprises manipulating a sign or said multiplication step is eliminated.

20. The method of claim 16, wherein all of said updating values subsequent to a first value are computed from a previously computed value by adding or subtracting one or two times the value of said selected input values.

21. The method of claim 16, wherein at least one member of said set of updating values is formed by using the negative of another member.

22. The method of claim 16, wherein half of the members of said set of updating values are formed by using the negatives of the other half of the members.

23. The method of claim 16, wherein at least one of said updating values is computed by combining two previously computed values.

24. A correlator, comprising:

a timing controller responsive to a clock signal;

an input signal storage means for storing input signals;

a latch coupled to an output of said input signal storage means, for sampling said input signals;

a signal combining and selecting means coupled to an output of said latch and said input signal storage means, for selecting sample combinations of said input signals;

a mapping logic means coupled to an input of said signal combining and selecting means and to an output of said timing controller, for generating a sign pattern based on a bit pattern of a codeword being correlated with said input signals;

a sign modifier coupled to an output of said mapping logic means, said signal combining and selecting means, and said timing controller;

an address offset storage register coupled to said mapping logic means and said timing controller; and an output signal storage means coupled to said address offset storage means, said sign modifier, and said timing controller, for temporarily storing a correlated output signal.

* * * * *